(12) United States Patent
DeCusatis et al.

(10) Patent No.: US 9,166,905 B2
(45) Date of Patent: *Oct. 20, 2015

(54) END-TO-END MULTIPATHING THROUGH NETWORK HAVING SWITCHING DEVICES COMPATIBLE WITH DIFFERENT PROTOCOLS

(71) Applicant: International Business Machines Corporation, Armonk, NY (US)

(72) Inventors: Casimer M. DeCusatis, Poughkeepsie, NY (US); Keshav G. Kamble, Fremont, CA (US); Abhijit P. Kumbhare, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/829,124

(22) Filed: Mar. 14, 2013

(65) Prior Publication Data

US 2013/0322447 A1      Dec. 5, 2013

Related U.S. Application Data

(63) Continuation of application No. 13/485,543, filed on May 31, 2012.

(51) Int. Cl.
  *H04J 3/16*  (2006.01)
  *H04L 12/707*  (2013.01)
  (Continued)

(52) U.S. Cl.
  CPC .................. *H04L 45/24* (2013.01); *H04L 45/02* (2013.01); *H04L 45/128* (2013.01)

(58) Field of Classification Search
  CPC ........ H04L 45/24; H04L 45/02; H04L 45/128
  USPC .......... 370/237, 253, 389, 392, 410, 419, 466
  See application file for complete search history.

(56) References Cited

U.S. PATENT DOCUMENTS

| 7,349,350 B2 | 3/2008 | Liu |
| 7,836,332 B2 | 11/2010 | Hara et al. |

(Continued)

OTHER PUBLICATIONS

Krishna Nibhanupudi et al., "Data Center Ethernet: Implementing Fibre Channel Hard Zoning on Ethernet Networks," CSE 533: Project Report Spring 2009, pp. 1-19.

(Continued)

*Primary Examiner* — Ajay Cattungal
(74) *Attorney, Agent, or Firm* — Mark Vallone

(57) ABSTRACT

A first cluster includes first switching devices that are compatible with a software-defined networking (SDN) protocol. A second cluster includes second switching devices within or partially overlapping the first cluster. Each second switching device is compatible with a protocol for an open systems interconnection (OSI) model layer. The first switching devices include one or more border switching devices located at a boundary between the first cluster and the second cluster. Each border switching device is also compatible with the protocol for the OSI model layer. The first switching devices effect first multipathing through the network except through the second cluster, and the second switching devices effect second multipathing just through the second cluster of the network. As such, the first switching devices and the second switching devices together effect end-to-end multipathing through both the first cluster and the second cluster of the network.

4 Claims, 5 Drawing Sheets

(51) Int. Cl.
*H04L 12/751* (2013.01)
*H04L 12/735* (2013.01)

(56) References Cited

U.S. PATENT DOCUMENTS

| | | | |
|---|---|---|---|
| 7,953,865 B1 | 5/2011 | Miller et al. | |
| 8,046,456 B1 | 10/2011 | Miller et al. | |
| 8,108,454 B2 * | 1/2012 | Snively et al. | 709/200 |
| 8,792,474 B2 | 7/2014 | DeCusatis | |
| 2003/0033427 A1 | 2/2003 | Brahmaroutu | |
| 2004/0156399 A1 | 8/2004 | Eran | |
| 2005/0010688 A1 | 1/2005 | Murakami et al. | |
| 2005/0271038 A1 | 12/2005 | Xin et al. | |
| 2006/0198323 A1 | 9/2006 | Finn | |
| 2006/0271706 A1 | 11/2006 | Dugan et al. | |
| 2007/0053283 A1 | 3/2007 | Bidwell et al. | |
| 2007/0127421 A1 | 6/2007 | D'Amico et al. | |
| 2008/0159277 A1 | 7/2008 | Vobbilisetty et al. | |
| 2009/0138577 A1 | 5/2009 | Casado et al. | |
| 2009/0274159 A1 | 11/2009 | Xia et al. | |
| 2010/0165968 A1 | 7/2010 | Shpak | |
| 2010/0226281 A1 | 9/2010 | Ghosh et al. | |
| 2010/0232419 A1 | 9/2010 | Rivers | |
| 2010/0257263 A1 | 10/2010 | Casado et al. | |
| 2010/0322255 A1 | 12/2010 | Hao et al. | |
| 2011/0029973 A1 | 2/2011 | Hara et al. | |
| 2011/0032933 A1 | 2/2011 | Eisenhauer et al. | |
| 2011/0182194 A1 * | 7/2011 | Jacquet et al. | 370/252 |
| 2011/0188511 A1 | 8/2011 | Di Benedetto | |
| 2011/0261826 A1 | 10/2011 | Armstrong et al. | |
| 2011/0271007 A1 | 11/2011 | Wang et al. | |
| 2011/0280253 A1 | 11/2011 | Habetha et al. | |
| 2011/0305168 A1 | 12/2011 | Koide | |
| 2012/0039604 A1 | 2/2012 | Dickens et al. | |
| 2012/0240185 A1 | 9/2012 | Kapoor et al. | |
| 2012/0243552 A1 | 9/2012 | Goodfellow et al. | |
| 2013/0194963 A1 * | 8/2013 | Hampel, Karl Georg | 370/254 |
| 2013/0250770 A1 * | 9/2013 | Zou et al. | 370/238 |
| 2013/0322292 A1 | 12/2013 | DeCusatis | |
| 2013/0322443 A1 | 12/2013 | Dunbar et al. | |
| 2013/0322454 A1 | 12/2013 | DeCusatis | |
| 2013/0322460 A1 | 12/2013 | DeCusatis | |
| 2013/0329601 A1 * | 12/2013 | Yin et al. | 370/254 |
| 2014/0286340 A1 | 9/2014 | DeCusatis | |

OTHER PUBLICATIONS

David Melman et al., "FCoE over Trill," Network Working Group, Internet-Draft ("work in progress"), Sep. 11, 2011, pp. 1-12.

A. Tavakoli et al., "Applying NOX to the Datacenter," Proc. HotNets, NY, NY, Oct. 2009, 6 pages.

Mysore et al., "PortLand: A Scalable Fault-Tolerant Layer 2 Data Center Network Fabric," SIDCOMM'09, Aug. 17-21, Barcelona, Spain, 2009, pp. 39-50.

Non-final office action for U.S. Appl. No. 13/485,543 dated Jun. 6, 2014.

Notice of allowance for U.S. Appl. No. 13/485,543 dated Nov. 25, 2014.

Non-final office action for U.S. Appl. No. 13/485,428 dated Dec. 19, 2013.

Final office action for U.S. Appl. No. 13/485,428 dated Aug. 12, 2014.

Notice of allowance for U.S. Appl. No. 13/485,428 dated Oct. 24, 2014.

Ex Parte Quayle Action for U.S. Appl. No. 13/827,479 dated Dec. 23, 2013.

Notice of allowance for U.S. Appl. No. 13/827,479 dated Mar. 20, 2014.

Non-final office action for U.S. Appl. No. 14/293,921 dated Nov. 21, 2014.

* cited by examiner

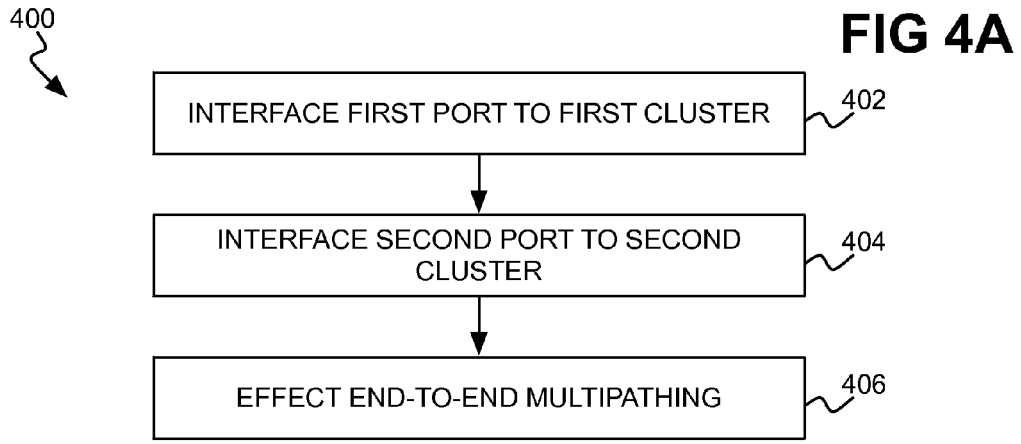
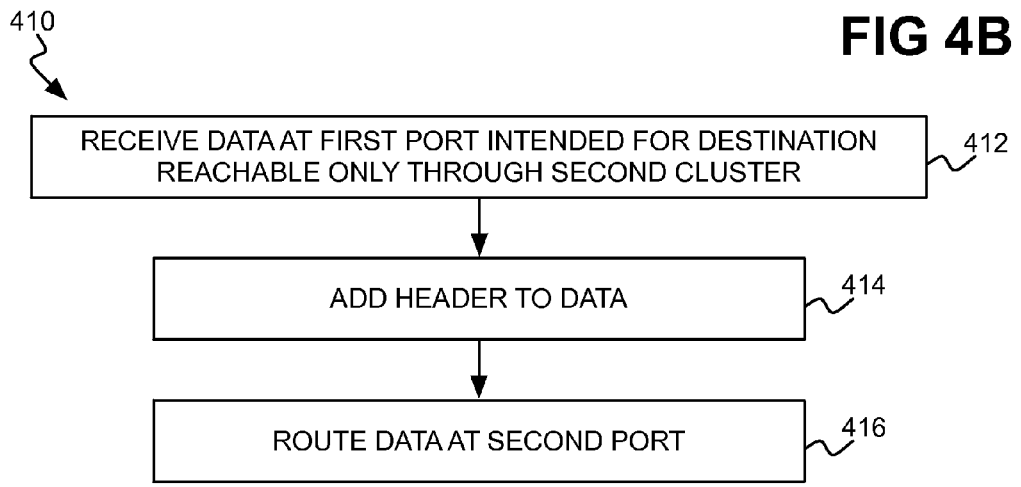
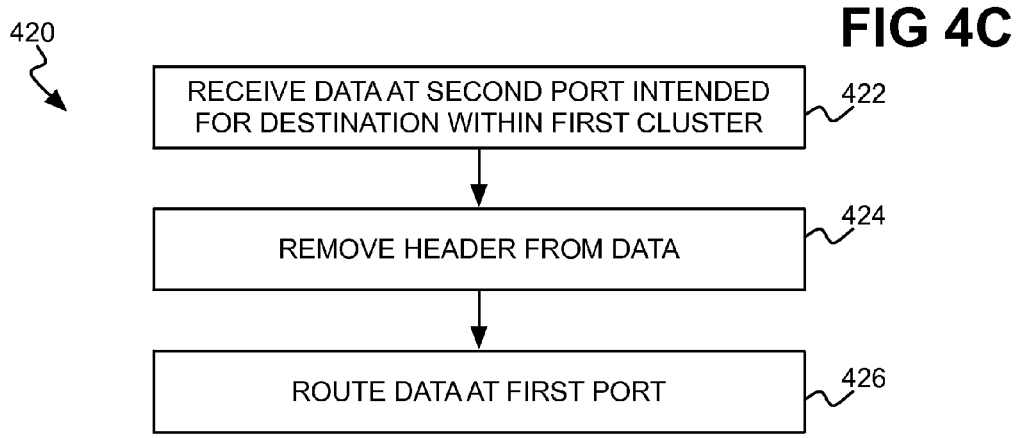

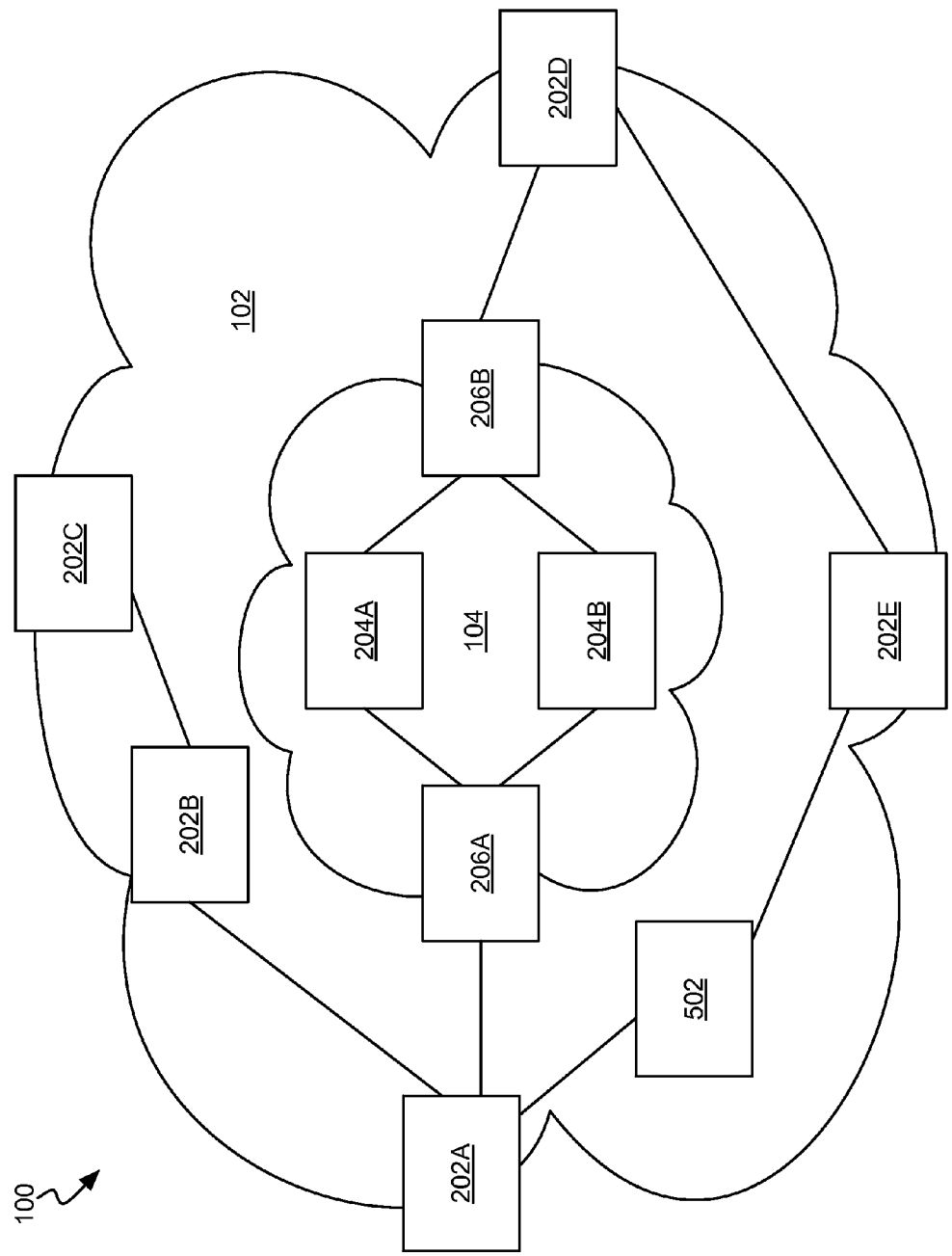

END-TO-END MULTIPATHING THROUGH NETWORK HAVING SWITCHING DEVICES COMPATIBLE WITH DIFFERENT PROTOCOLS

RELATED APPLICATIONS

The present patent application is related to the patent application entitled "multipath effectuation within singly contiguous network fabric via switching device routing logic programming," filed on Mar. 14, 2013, and assigned application Ser. No. 13/827,479.

BACKGROUND

Network fabrics include devices, which are often referred to as nodes, that are interconnected to one another through a web of various switching devices like routers, hubs, switches, and so on. The network fabrics permit the devices to be interconnected for a variety of different purposes. For instance, the devices may be interconnected to implement a local-area network or a wide-area network for data transmission purposes, to implement a storage-area network, to achieve clustering, and so on.

SUMMARY

A method of an embodiment of the disclosure includes interfacing, at a first port of a border switching device, a first cluster of first switching devices compatible with an SDN protocol. The method includes interfacing, at a second port of the border switching device, a second cluster of second switching devices compatible with a protocol for an OSI model layer. The method includes receiving, at the first port, data through the first cluster that is intended for a destination reachable only through the second cluster. The data is formatted according to the SDN protocol. The method includes, in response to receiving the data at the first port adding to the data, by the border switching device, a header formatted according to the protocol for the OSI model layer. The method includes, also in response to receiving the data at the first port, routing the data, including the header, from the second port through the second cluster to another border switching device that is closest to the destination.

A method of another embodiment of the disclosure similarly includes interfacing, at a first port of a border switching device, a first cluster of first switching devices compatible with an SDN protocol. The method similarly includes interfacing, at a second port of the border switching device, a second cluster of second switching devices compatible with a protocol for an OSI model layer. The method includes receiving, at the second port, data through the second cluster that is intended for a destination reachable within the first cluster. The data is formatted according to the SDN protocol. The method includes, in response to receiving the data at the second port, removing a header from the data, by the border switching device. The header is formatted according to the protocol for the OSI model layer. The method includes, also in response to receiving the data the first port, routing the data, without the header, from the first port through the first cluster towards the destination.

BRIEF DESCRIPTION OF THE SEVERAL VIEWS OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

FIGS. 4A, 4B, and 4C are flowcharts of example methods that together achieve end-to-end multipathing through a heterogeneous or hybrid network.

FIG. 5 is a diagram of another example of a heterogeneous or hybrid network that shows rudimentary constituent switching devices thereof.

DETAILED DESCRIPTION

Figure 1A:
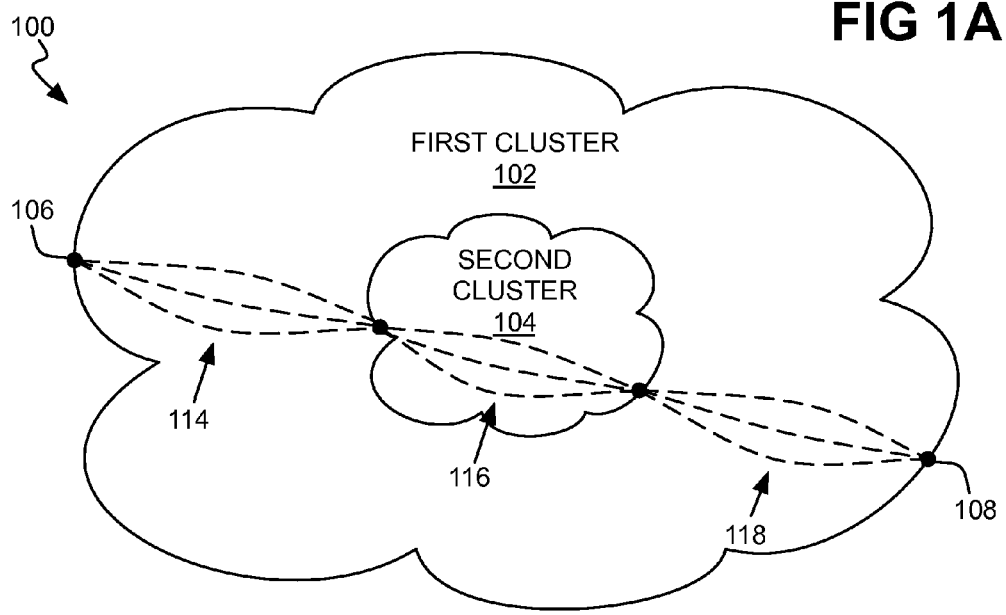
FIGS. 1A and 1B are diagrams of different examples of a heterogeneous or hybrid network.

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the embodiment of the invention is defined only by the appended claims.

As noted in the background section, a network fabric includes devices, which can be referred to as nodes, that are interconnected to one another through a web of various switching devices like routers, hubs, switches, and so on. As such, the nodes can communicate with one another by transmitting data through the network fabric, and more specifically via the switching devices routing the data between the nodes. Different switching devices are compatible with different protocols.

For example, a traditional protocol that provides for communication among switching devices of a network fabric is a protocol for an open systems interconnection (OSI) model layer, such as what is known as a layer-two protocol. Examples of layer-two protocols include the transparent interconnection of lots of links (TRILL) layer-two protocol, and the shortest-path bridging (SPB) layer-two protocol. The TRILL layer-two protocol is maintained by the Internet Engineering Task Force (IETF), which is an organized activity of the Internet Society (ISOC) based in Reston, Va. The SPB layer-two protocol is maintained as the 802.11aq standard by the Institute of Electrical and Electronics Engineers (IEEE) based in Washington, D.C.

More recently, software-defined networking (SDN) protocols have been adopted. An SDN protocol differs in at least one respect from a more traditional protocol in that the switching devices can be relatively low cost and so-called "dumb" switching devices that do not have much if any built-in routing logic. Instead, the switching devices are programmed and controlled by an external network fabric controller device over a programming path different than the data path and/or the control path of the network. An example of an SDN protocol is the OpenFlow protocol maintained by the Open Networking Foundation of Palo Alto, Calif.

Many experts expect SDN protocols to ultimately supplant to at least some degree more traditional protocols, due to the extensibility, flexibility, and potential for cost savings that they provide. However, entities cannot be realistically expected to replace all their existing switching devices with SDN protocol-compatible switching devices wholesale at the same time, due to the expense of purchasing the equipment and the time and expense in setting up and configuring these devices. Therefore, for at least the foreseeable future, it is expected that heterogeneous or hybrid networks will become more prevalent if not the norm, in which switching devices compatible with different protocols are asked to coexist on the same network.

This scenario can be problematic, however, where multipathing is concerned. Switching devices can and do fail, and a network fabric can be susceptible to faults that prevent data from being successfully routed among the nodes. Therefore, it can be important to have multiple redundant paths through a network fabric, to ensure that data is successfully routed among nodes even in the presence of faults such as switching device failure. One approach to achieving this is to provide for multipathing within a singly contiguous network fabric.

In a singly contiguous network fabric, there is just one physically contiguous network of switching devices. Multipathing ensures that there are different paths between two given nodes through the network fabric. The multipaths themselves can be disjoint or shared. Shared multipaths have one or more switching devices in common, but still vary from one another. Disjoint multipaths have no switching devices in common, by comparison. Multipathing within heterogeneous or hybrid networks, however, is difficult; that is, it is difficult to guarantee that a given multipath can span end-to-end across clusters of switching devices that are compatible with different networking communication protocols.

Techniques disclosed herein provide for innovative approaches to realizing multipathing within such a heterogeneous or hybrid network. These techniques are applicable in a network that includes at least two clusters of switching devices. First switching devices of a first cluster are compatible with an SDN protocol, whereas second switching devices of a second cluster within or partially overlapping the first cluster are compatible with a protocol for an OSI model layer. The first switching devices include border switching devices located at a boundary between the two clusters. Each border switching device is compatible with the protocol for the OSI model layer in addition to being compatible with the SDN protocol.

The first switching devices effect multipathing through the network except through the second cluster, whereas the second switching devices effect second multipathing just through the second cluster. As such, the first and second switching devices, including the border switching devices, together effect end-to-end multipathing through both the first and second clusters of the network. To the first cluster, the second cluster may be effectively treated as a black box, such as a single switching device, even though the second cluster is in fact made up of multiple switching devices.

In this respect, in one implementation the SDN protocol of the first cluster may be the OpenFlow protocol, whereas the OSI model layer protocol of the second cluster may be the TRILL or the SBP protocol. The border switching devices are compatible with both protocols, and have ports to connect to both clusters. When data from the first cluster has to traverse the second cluster to reach its destination, the border switching devices add and remove headers to the data as appropriate to ensure that the data can travel through the second cluster. The first switching devices assume responsibility for multipathing within the first cluster, whereas the second switching devices assume responsibility for multipathing within the second cluster, to ensure end-to-end multipathing through the network as a whole.

Figure 1B:
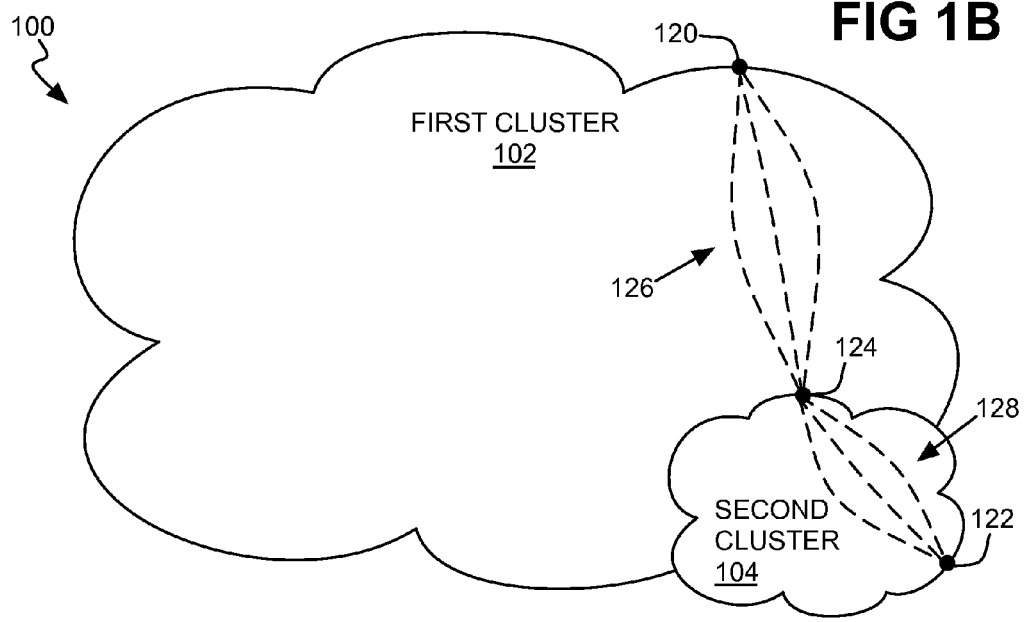

FIGS. 1A and 1B show different examples of a heterogeneous or hybrid network 100. The network 100 includes a first cluster 102 and a second cluster 104. In the example of FIG. 1A, the second cluster 104 is completely within the first cluster 102. In the example of FIG. 1B, the second cluster 104 at least partially overlaps the first cluster 102. The first cluster 102 is compatible with an SDN protocol, such as the OpenFlow protocol, whereas the second cluster 104 is compatible with a protocol for an OSI model layer, such as the TRILL or the SPB layer-two protocol.

End-to-end multipathing is effected through the heterogeneous or hybrid network 100 as a whole. This means that there are multiple paths through the network 100 as a whole. End-to-end multipathing in the context of the network 100 further means that there can be first multipathing within and provided by the first cluster 102, and second multipathing within and provided by the second cluster 104. The multipathing provided by the first and second clusters 102 and 104 thus effect the end-to-end multipathing through the network 100 as a whole.

For example, in FIG. 1A, data may have to be transmitted from a point 106 at one edge of the first cluster 102 to a point 108 at another edge of the first cluster 102, which may require transmission of the data through the second cluster 104 from a point 110 at one edge thereof to a point 112 at another edge thereof. Therefore, multipaths 114 between the points 106 and 110 through the first cluster 102 are determined, as are multipaths 116 between the points 110 and 112 through the second cluster 104 and multipaths 118 between the points 112 and 108 through the first cluster 102. The multipaths 114 and 118 make up the first multipathing effected within and provided by the first cluster 102, whereas the multipaths 116 make up the second multipathing effect within and provided by the second cluster 104, to achieve end-to-end multipathing through the heterogeneous or hybrid network 100 as a whole.

As another example, in FIG. 1B, data may have to be transmitted from a point 120 at an edge of the first cluster 102 to a point 122 at an edge of the second cluster 104. Therefore, multipaths 126 through the first cluster 102 between the point 120 at the edge of the first cluster 102 and a point 124 at a boundary between the first and second clusters 102 and 104 are determined, as are multipaths 128 through the second cluster 104 between the points 124 and 122. The multipaths 126 make up the first multipathing effected within and provided by the first cluster 102, whereas the multipaths 128 make up the second multipathing effected within and provided by the second cluster 104, to achieve end-to-end multipathing through the heterogeneous or hybrid network 100 as a whole.

Figure 2:
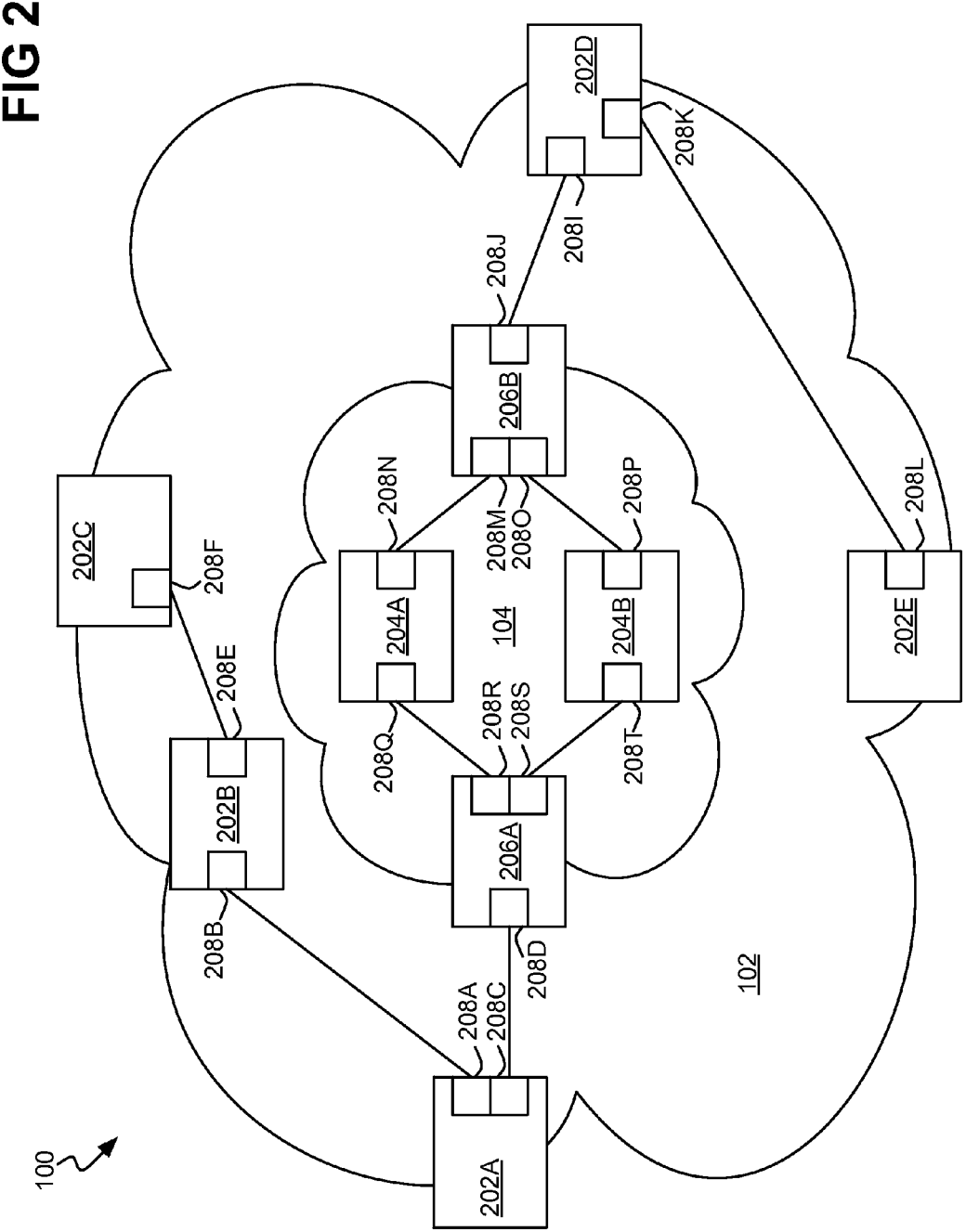
FIG. 2 is a diagram of an example of a heterogeneous or hybrid network that shows rudimentary constituent switching devices thereof

FIG. 2 shows a rudimentary example implementation of the heterogeneous or hybrid network 100 of the example of FIG. 1. The first cluster 102 includes first switching devices 202A, 202B, 202C, 202D, and 202E, collectively referred to as the first switching devices 202. The first switching devices 202 are compatible with an SDN protocol, like the OpenFlow protocol, and are located within or at an edge of the first cluster 102 other than a boundary between the first cluster 102 and the second cluster 104.

The second cluster 104 includes second switching devices 204A and 204B, collectively referred to as the second switching devices 204. The second switching devices 204 are compatible with a protocol for an OSI model layer, such as the TRILL layer-two protocol or the SBP layer-two protocol. The second switching devices 204 are located within or at an edge of the second cluster 104 other than a boundary between the first cluster 102 and the second cluster 104.

The heterogeneous or hybrid network 100 also includes border switching devices 206A and 206B, collectively referred to as the border switching devices 206. The border switching devices 206 are located at a boundary between the first cluster 102 and the second cluster 104. The border switching devices 206 are compatible with both the SDN protocol and the protocol for an OSI model layer. In this sense, the border switching devices 206 can be considered as first switching devices of the first cluster 102, as well as second switching devices of the second cluster 104.

The switching devices 202, 204, and 206 are switching devices like routers, hubs, switches, and so on. There are at least one or more first switching devices 202, one or more second switching devices 204, and one or more border switching devices 206. The switching devices 202, 204, and 206 include ports 208A, 208B, 208C, 208D, 208E, 208F, 208I, 208J, 208K, 208L, 208M, 208N, 208O, 208P, 208Q, 208R, 208S, and 208T, collectively referred to as the ports 208. The ports 208 interconnect the switching devices 202, 204, and 206. Other ports, not depicted in FIG. 2, can connect the switching devices 202, 204, and 206 to other types of devices, or nodes.

Each port 208 is a network port that is compatible with the SDN protocol or the protocol for the OSI model layer. The ports 208 of the first switching devices 202 are compatible with the SDN protocol, and the ports 208 of the second switching devices 204 are compatible with the protocol for the OSI model layer. Each ports 208 of each border switching device 206 can be programmed to be compatible with the SDN protocol or with the protocol for the OSI model layer, but not both protocols at the same time.

The ports 208A, 208B, 208C, 208D, 208E, 208F, 208I, 208J, 208K, and 208L are compatible with the SDN protocol. The port 208A of the first switching device 202A is connected to the port 208B of the first switching device 202B, and the port 208C of the first switching device 202A is connected to the port 208D of the border switching device 206A. The port 208E of the first switching device 202B is connected to the port 208F of the first switching device 202C. The port 208I of the first switching device 202D is connected to the port 208J of the border switching device 206B. The port 208K of the first switching device 202D is connected to the port 208L of the first switching device 202E.

The ports 208M, 208N, 208O, 208P, 208Q, 208R, 208S, and 208T are compatible with the protocol for the OSI model layer. The port 208M of the border switching device 206B is connected to the port 208N of the second switching device 204A. The port 208O of the border switching device 206B is connected to the port 208P of the second switching device 204B. The port 208Q of the second switching device 204A is connected to the port 208R of the border switching device 206A. The port 208S of the border switching device 206A is connected to the port 208T of the second switching device 204B.

Multipathing within the first cluster 102, via the first switching devices 202 and the border switching devices 208, can be effected by suitably programming the switching devices 202 and 208. For example, in the context of the OpenFlow protocol, multipathing can be achieved as described in the patent application entitled "multipath effectuation within singly contiguous network fabric via switching device routing logic programming" noted above. Multipathing can be effected within the first cluster 102 in other ways as well.

Multipathing within the second cluster 104, via the second switching devices 204 and the border switching devices 206, can be effected as provided by the TRILL layer-two protocol or the SPB layer-two protocol, and by suitably programming the border switching devices 206, without necessarily having to program the second switching devices 204. For example, a type-length-value (TLV) extension can be provided for the TRILL layer-two protocol to achieve such multipathing within the second cluster 104. The border switching devices 206 in particular can use the extension to cause multipathing through the second cluster 104. The TLV extension can be used to force unicast traffic through the second cluster 104 to follow disjoint or shared multipaths.

End-to-end multipathing through the heterogeneous or hybrid network 100 means that it is guaranteed data can take shared or disjoint multipaths through the network 100. For at least some data, this means that both the first cluster 102 and the second cluster 104 have to be traversed, whereas for other data, just the first cluster 102 may have to be traversed. As an example of the latter, if data is received at the first switching device 202A that is intended for the first switching device 202C, the first switching device 202A can transmit this data through the first switching device 202B to reach the first switching device 202C, completely within the first cluster 102 and without having to traverse the second cluster 104.

However, as an example of the former, if data is received at the first switching device 202A that is intended for the first switching device 202D, the data has to be transmitted through the second cluster 104 to reach first switching device 202D. In the example of FIG. 2, there is no way for the first switching device 202A to communicate with the first switching device 202D except through the second cluster 104. Therefore, the first switching device 202A sends the data to the border switching device 206A, which sends the data through the second switching device 204A or 204B to the border switching device 206B, which sends the data to the first switching device 202D.

Each border switching device 206 is aware of every other border switching device 206 so that the border switching devices 206 can properly transmit data through the second cluster 104. In the example of FIG. 2, this means that the border switching device 206A is aware of the border switching device 206B, and vice-versa. Each border switching device 206 receives and sends data within the first cluster 102 via a port 208 thereof that is specifically compatible with the SDN protocol, and that interfaces the border switching device 206 in question to one of the first switching devices 202. Each border switching devices 206 similarly receives and sends data within the second cluster 104 via a port 208 thereof that is specifically compatible with the protocol for the OSI model layer, and that interfaces the border switching device 206 in question to one of the second switching devices 204.

Note in this respect that in the example of FIG. 2, each border switching device 206 is depicted as including one SDN protocol-compatible port 208 and two OSI model layer protocol-compatible ports 208. More generally, however, each border switching device 206 includes at least one SDN protocol-compatible port 208 and at least one OSI model layer protocol-compatible port 208. Similarly, more generally each first switching device 202 includes at least one SDN protocol-compatible port 208, and more generally each second switching device 204 includes at least one OSI model layer protocol-compatible port 208.

Figure 3:
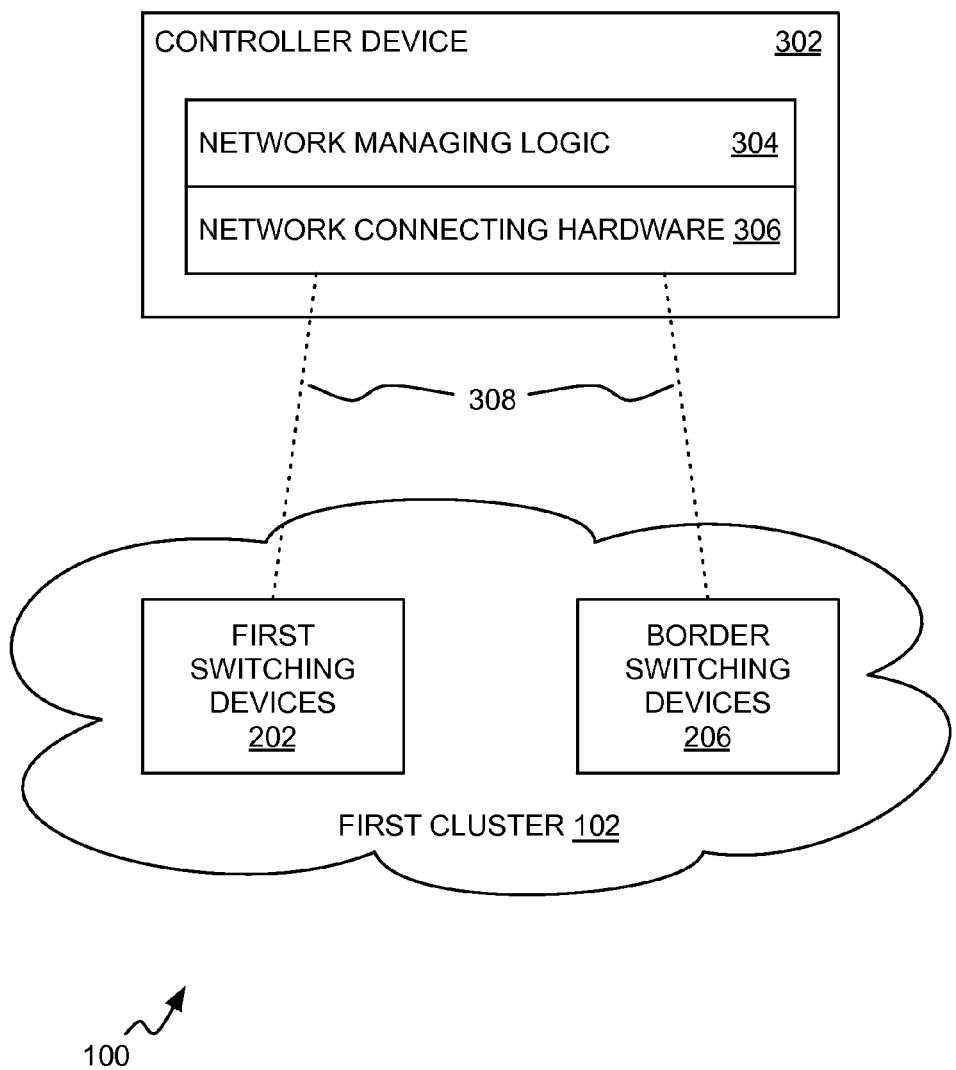
FIG. 3 is a diagram of an example portion of a heterogeneous or hybrid network that shows how switching devices thereof can be programmed by a network fabric controller device.

FIG. 3 shows an example portion of the network 100, specifically just the first cluster 102 thereof, to depict how the first switching devices 202 and/or the border switching devices 206 can be programmed to effect multipathing within the first cluster 102, and how the border switching devices 206 can be programmed to effect multipathing within the second cluster 104. Note that the second cluster 104 is not depicted in FIG. 3 for illustrative clarity. There is a network fabric controller device 302, which can be an OpenFlow controller (OFC) device, and in the example described herein, is presumed to be such. The OpenFlow protocol permits an OpenFlow switch, or switching device, like the switching devices 202 and 206, to be completely programmed by an OFC device. An OFC device thus can program OpenFlow switching devices to perform data routing as desired.

The network fabric controller device 302 includes network managing logic 304 and network connecting hardware 306. The controller device 302 can also include other components, in addition to the network connecting hardware 306 and/or the network managing logic 304. The network connecting hardware 306 is hardware that connects the controller device 302 to the first switching devices 202 and the border switching devices 206 via a programming path or channel 308.

The network managing logic 304 may be implemented as software, hardware, or a combination of software and hardware. As one example, the network managing logic 304 may be a computer program stored on a computer-readable data storage medium and executable by a processor. As another example, the network managing logic 304 may be implemented as hardware, such as an application-specific integrated circuit (ASIC), a field-programmable gate array (FPGA), and so on.

The network managing logic 304 performs the programming of the switching devices 202 and 206 to effect end-to-end multipathing through the network 100 as has been described. That is, the first switching devices 202 and/or the border switching devices 206 are programmed over the programming path or channel 308 to effect first multipathing within the first cluster 102, and the border switching devices 206 are programmed over this same path or channel 308 to effect second multipathing within the second cluster 104. Because multipathing is achieved in each of the first and second clusters 102 and 104, this means that end-to-end multipathing over the network 100 as a whole is effected.

The programming path or channel 308 is the path or channel of the network fabric of the first cluster 102 by which components thereof, such as the switching devices 202 and 206, are programmed. For instance, the network fabric controller device 302 can load routing tables and/or other types of programming logic into the switching devices 202 and 206. As such, the controller device 302 can effectively control how the switching devices 202 and 206 route the data through the first cluster 102 (and in the case of the border switching devices 206, through the second cluster 104).

By comparison, the first switching devices 202 and the border switching devices 206 are intraconnected and interconnected via a data path or channel 310. The data path or channel 310 is thus the path or channel of the network fabric of the first cluster 102 by which components thereof, such as the switching devices 202 and 206, communicate data. The network fabric controller device 302 is not typically connected to the data path or channel 310.

A third channel may also be presented, but which is not depicted in FIG. 3, and which is referred to as a control path or channel, along which control information regarding such components of the network fabric of the first cluster 102 is transmitted. This control information can include port information, address information, and other types of control information regarding these components. The network fabric controller device 302 may not typically be connected to the control path or channel, but rather a device that is referred to as a fiber channel (FC) or FC over Ethernet (FCoE) channel forwarder (FCF) device is, and which may be communicatively connected to the controller device 302. In one implementation, however, a single device, such as a single server computing device, may include the functionality of such an FCF device and the functionality of the controller device 302. Like the controller device 302, an FCF device does not route the actual data through the network fabric itself.

The various paths or channels may be logical/virtual or physically discrete paths or channels. For example, there may indeed be just single hardware lines interconnecting the ports 208 of the switching devices 202 and 206 and ports of the network fabric controller device 302. However, these hardware lines may have the paths or channels virtually or logically overlaid thereon or defined therein. For instance, the programming path or channel 308 may be a secure socket layer (SSL) channel that uses the same hardware lines that the data path or channel 310 uses.

FIGS. 4A, 4B, and 4C show example methods 400, 410, and 420, respectively, but which may be part of the same method in some implementations. The methods 400, 410, and 420 can be implemented as one or more computer programs stored on a computer-readable data storage medium. Execution of the computer programs, such as by a processor of a device, causes the method(s) in question to be performed.

In the method 400 of FIG. 4A, a first port 208 of a border switching device 206 is interfaced to the first cluster 102 of the first switching devices 202 that are compatible with an SDN protocol (402). As such, the border switching device 206 sends and receives SDN protocol-formatted data using this first port 208. Similarly, a second port 208 of the border switching device 206 is interfaced to the second cluster 104 of the second switching devices 204 that are compatible with an OSI model layer protocol (404). As such, the border switching device 206 sends and receives OSI model layer protocol-formatted data using this second port 208.

End-to-end multipathing is then suitably achieved (406), by each border switching device 206 in concert with the first switching devices 202 and the second switching devices 204. As noted above, the end-to-end multipathing is through both the first and second clusters 102 and 104. That is, this multipathing includes (first) multipathing through the first cluster 102, via the border switching devices 206 in concert with the first switching devices 202, as well as (second) multipathing through the second cluster 104, via the border switching devices 206 in concert with the second switching devices 204.

The method 410 of FIG. 4B and the method 420 of FIG. 4C are described in relation to the example presented above in relation to FIG. 2. In this example, the border switching device 206A receives data through the first cluster 102 from the first switching device 202A intended for the first switching device 202D. The border switching device 206A sends the data through the second cluster 104 to the border switching device 206B. The border switching device 206B then sends the data through the first cluster 102 to the first switching device 202D.

In the method 410 of FIG. 4B, then, the border switching device 206A receives at the port 208D data through the first cluster 102 that is intended for a destination—the first switching device 202D—that is reachable only through the second cluster 104 (412). The data is formatted according to the SDN protocol of the first cluster 102, insofar as the data was received over the first cluster 102. In response to receiving this data at the port 208D, the border switching device 206A performs the following.

First, the border switching device 206A adds a header to the data (414). The header is formatted according to the OSI model layer protocol. By adding such a header to the SDN protocol-formatted data, the data can now be sent through the second cluster 104 using the OSI model layer protocol. Therefore, second, the border switching device 206A routes the data, including the header, from the port 208R or 208S through the second cluster 104 to the border switching device 206B (416), which is the closer or closest border switching device 206 to the destination of the data, the first switching device 202D.

In the method 420 of FIG. 4C, the border switching device 206B receives at the port 208M or 208O this data through the second cluster 104 that is intended for a destination, the first switching device 202D, within the first cluster 102 (422). The data as received by the border switching device 206B includes the header that the border switching device 206A added thereto in part 414. In response to receiving this data at the port 208M or 208O, the border switching device 206B performs the following.

First, the border switching device 206B removes or strips the header from the data (424). By removing the OSI model layer protocol-formatted header from the data, the data can now be sent through the first cluster 102 using the SDN protocol. Therefore, second, the border switching device 206B routes the data, without the header, from the port 208J through the first cluster 102 to or towards the destination of the data (426), which is the first switching device 202D.

It is noted that in some networking topologies, the first cluster 102 may include one or more switching devices that do not support and thus are not compatible with the SDN protocol. Where there is a limited number of such switching devices, it may not be advisable to add border switching devices around them to create another contained cluster, like the second cluster 104, within the first cluster 102. This is because doing so can add unneeded complexity to the resulting network 100. Rather, a different approach can be employed, as is now described.

FIG. 5 shows a version of the example heterogeneous or hybrid network 100 of FIG. 2, in which there is such a third switching device 502 that does not support and is not compatible with the SDN protocol. In FIG. 5, the ports 208 of the switching devices 202, 204, and 206 (and ports of the switching device 502) are not depicted for illustrative clarity and convenience. The third switching device 502 is connected to the first switching device 202A and to the first switching device 202E.

It is presumed that the first switching device 202A is to send data to the first switching device 202E. Although there is a path through the network 100 that avoids having to route data through the third switching device 502—namely, the path including the border switching devices 206, the second cluster 104, and the first switching device 202D—this path is not as desirable as routing the data through the third switching device 502. This is because the data may take longer to reach the first switching device 202E, because the number of hops—i.e., the number of switching devices that the data has to traverse—is longer if the data were routed through the second cluster 104.

Therefore, the first switching devices 202A and 202E can effect multipathing through the third switching device 502 by tunneling the SDN protocol-formatted traffic through the third switching device 502. The tunneling can be achieved by using encapsulation at a networking protocol layer level higher than the layer level of the SDN protocol. For example, if the SDN protocol is a layer-two protocol, the data formatted according to the SDN protocol can be encapsulated at a layer-three protocol, such as the Internet Protocol (IP). This approach thus is another technique by which end-to-end multipathing through a heterogeneous or hybrid network 100 can be achieved.

It is noted that, as can be appreciated by one those of ordinary skill within the art, aspects of the present invention may be embodied as a system, method or computer program product. Accordingly, aspects of the embodiments of the invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

In general, a computer program product includes a computer-readable medium on which one or more computer programs are stored. Execution of the computer programs from the computer-readable medium by one or more processors of one or more hardware devices causes a method to be performed. For instance, the method that is to be performed may be one or more of the methods that have been described above.

The computer programs themselves include computer program code. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It is finally noted that, although specific embodiments have been illustrated and described herein, it will be appreciated by those of ordinary skill in the art that any arrangement calculated to achieve the same purpose may be substituted for the specific embodiments shown. This application is thus intended to cover any adaptations or variations of embodiments of the present invention. As such and therefore, it is manifestly intended that this invention be limited only by the claims and equivalents thereof.

We claim:

1. A method comprising:
   interfacing, at a first port of a border switching device, a first cluster of first switching devices compatible with a software-defined networking (SDN) protocol, the first switching devices including the border switching device;
   interfacing, at a second port of the border switching device, a second cluster of second switching devices compatible with a protocol for an open systems interconnection (OSI) model layer;
   receiving, at the first port, data through the first cluster that is intended for a destination reachable only through the second cluster, the data formatted according to the SDN protocol;
   in response to receiving the data at the first port,
      adding to the data, by the border switching device, a header formatted according to the protocol for the OSI model layer;
      routing the data, including the header, from the second port through the second cluster to another border switching device that is closest to the destination; and
   effecting first multipathing through the first cluster using one or more third switching devices within the first cluster that are not compatible with the SDN protocol, via at least the border switching device tunneling traffic of the SDN protocol through the third switching devices using encapsulation at a layer level higher than a layer level of the SDN protocol.

2. The method of claim 1, further comprising effecting end-to-end multipathing, by the border switching device in concert with the second switching devices and with other of the first switching devices, through both the first cluster and the second cluster, including the first multipathing and second multipathing through the second cluster by the border switching device in concert with the second switching devices.

3. A method comprising:
   interfacing, at a first port of a border switching device, a first cluster of first switching devices compatible with a software-defined networking (SDN) protocol, the first switching devices including the border switching devices;
   interfacing, at a second port of the border switching device, a second cluster of second switching devices compatible with a protocol for an open systems interconnection (OSI) model layer;
   receiving, at the second port, data through the second cluster that is intended for a destination reachable within the first cluster, the data formatted according to the SDN protocol;
   in response to receiving the data at the second port,
      removing a header from the data, by the border switching device, the header formatted according to the protocol for the OSI model layer;
      routing the data, without the header, from the first port through the first cluster towards the destination; and
   effecting first multipathing through the first cluster using one or more third switching devices within the first cluster that are not compatible with the SDN protocol, via at least the border switching device tunneling traffic of the SDN protocol through the third switching devices using encapsulation at a layer level higher than a layer level of the SDN protocol.

4. The method of claim 3, further comprising effecting end-to-end multipathing, by the border switching device in concert with the second switching devices and with other of the first switching devices, through both the first cluster and the second cluster, including the first multipathing and second multipathing through the second cluster by the border switching device in concert with the second switching devices.

* * * * *